United States Patent [19]

Mast

[11] Patent Number: 4,583,300

[45] Date of Patent: Apr. 22, 1986

[54] AUTOMATIC GRAIN DRYING SYSTEM

[75] Inventor: Milford S. Mast, Elverson, Pa.

[73] Assignee: Advanced AG Systems, Inc., Elverson, Pa.

[21] Appl. No.: 570,933

[22] Filed: Jan. 16, 1984

[51] Int. Cl.[4] ............................................. F26B 21/06
[52] U.S. Cl. ........................................... 34/50; 34/54; 34/55; 98/55
[58] Field of Search .................... 34/50, 53, 54, 55; 98/55

[56] References Cited

U.S. PATENT DOCUMENTS

| | | | |
|---|---|---|---|
| 46,214 | 6/1851 | Stivers | 98/55 |
| 1,542,721 | 6/1925 | Piening et al. | 98/55 |
| 2,645,991 | 7/1953 | Hobson | 98/55 |
| 2,655,734 | 10/1953 | Ohlheiser | 34/54 |
| 2,855,697 | 10/1958 | Barre | 34/46 |
| 2,935,009 | 5/1960 | Cloud et al. | 34/54 |
| 3,217,424 | 11/1965 | Johnson et al. | 34/50 |
| 3,546,893 | 12/1970 | Frudeger | 98/55 |
| 3,563,460 | 2/1971 | Nine | 98/55 |
| 3,646,874 | 3/1972 | Hamerski | 98/55 |
| 4,004,352 | 1/1977 | Steffen | 98/55 |
| 4,053,991 | 10/1977 | Steffen | 34/54 |
| 4,247,989 | 2/1981 | Steffen | 98/55 |
| 4,256,029 | 3/1981 | Steffen et al. | 98/55 |
| 4,293,854 | 10/1981 | Gookins et al. | 340/615 |
| 4,386,471 | 6/1983 | Bowrey et al. | 34/54 |
| 4,522,335 | 6/1985 | Kallestad et al. | 34/54 |

OTHER PUBLICATIONS

Publication MWPS-22, Low Temperature & Solar Grain Drying Handbook by Midwest Plan Service pp. 5-9, 20-22.

Primary Examiner—Albert J. Makay
Assistant Examiner—David W. Westphal
Attorney, Agent, or Firm—Michael R. Swartz; John R. Flanagan

[57] ABSTRACT

A system of grain drying in a specially constructed bin which involves electronic readings of multiple parameters and control of the operation of high volume blowers by a programable control system which reacts to the parameters. Sensors read ambient air humidity and temperature and grain temperature at various locations in the grain bin. These readings are combined with grain moisture readings secured through sampling ports to control the air flow based on a preset goal for moisture level of the grain. Various parameters are also displayed for operator information.

19 Claims, 2 Drawing Figures

AUTOMATIC GRAIN DRYING SYSTEM

BACKGROUND OF THE INVENTION

This invention relates generally to ventilation, and more specifically to ventilation during storage within grain bins.

Cost effective grain management systems require not only rapid drying of the grain, but also control of the grain moisture content during storage. Since storage may continue for a relatively long period of time, it is virtually certain that storage bin conditions will vary greatly between drying and storage conditions. Economy and safety considerations have generally moved the agriculture industry toward ambient air drying of grain as opposed to fuel heated air for drying. However, this trend adds to the difficulty in properly controlling grain moisture, since unheated air can vary greatly in its own moisture content. It is, in fact, quite possible to have air conditions which, rather than drying the grain, actually increase the moisture content in the grain.

While there have been previous efforts to avoid these problems by using temperature sensors to determine proper drying conditions, these methods do not actually solve the difficulties because they do not comprehend the full scope of the problem.

SUMMARY OF THE INVENTION

The present invention approaches the problems of grain drying and management of grain storage as a total system problem, and takes into account all factors which affect the drying process before taking action. Moreover, the present invention is completely automatic, so that the operator need only specify the end condition desired, and all other actions are controlled to accomplish the prescribed goal.

In a system such as that of the present invention, since no external heat is supplied, the actual drying is accomplished only by forced ventilation of ambient (outside) air through the storage bin. This is done by constructing the storage bin with an air plenum below the grain. This plenum is actually formed by a false bottom in the bin which is a perforated plate. The other surfaces of the plenum are sealed except for access to high volume, high pressure blowers which draw air from outside the bin and pressurize the plenum so air is blown through the perforated plate and upward through the grain.

The cylindrical bin has a roof shaped as an inverted cone and ventilators are located in the roof. These ventilators, preferably the type which is powered by the wind, vent the air from the top of the bin after it has passed through the grain, and thus complete the air flow circuit from outside the bin, through the grain and back outside.

It is the specific control of the blower which makes this air circulation system a grain drying system rather than a mere ventilating system. The comparator of the system combines several parameters which are monitored by sensors located in appropriate locations within the system, along with a manually set goal for desired grain moisture, into an automatic action to operate the blower only when the operation will aid in attaining the moisture level desired.

The various parameters monitored are air temperature and humidity outside the bin, air temperature and humidity inside the bin, grain moisture content at several levels within the bin, and grain temperature at multiple levels within the grain in the bin.

The multiple temperature readings within the grain are attained by the use of multiple temperature sensors each at a different height, mounted in a line parallel to the bin axis and remote from the bin side, so that with the bin full of grain, the sensors are in direct contact with the grain and monitoring its temperature at many heights in the bin. An additional sensor is used to monitor the temperature at the top of the grain at a point remote from the top of the line of sensors and is connected by a long umbilical cord to permit its use with widely varying grain pile sizes.

Grain moisture readings are secured through several ports in the side of the bin. These ports can be used to manually remove grain and test it for moisture by conventional moisture measuring devices or, preferably, these same ports can be fitted with automatic grain moisture measuring devices which generate direct electrical signals for connection to the comparator. If moisture readings are taken from manually removed grain, they can be entered into the comparator by manually setting internal controls which provide voltages to the comparator.

The present invention also displays the various parameters it measures, and while it contains a manual override, it also includes a mode of operation in which the manual override is itself deactivated after a preset time and the system returned to automatic operation.

The present invention permits the drying of grain, or the maintenance of a specific level of moisture in the grain, without the constant attention that such results previously required. Moreover, the system accomplishes this without the consumption of fuel, even if ambient air drying conditions are not consistently favorable. When such unfavorable conditions exist, the system merely shuts down and only restarts when favorable conditions once more are present or aeration is required so as not to compromise grain quality.

DETAILED DESCRIPTION OF THE INVENTION

Figure 1:
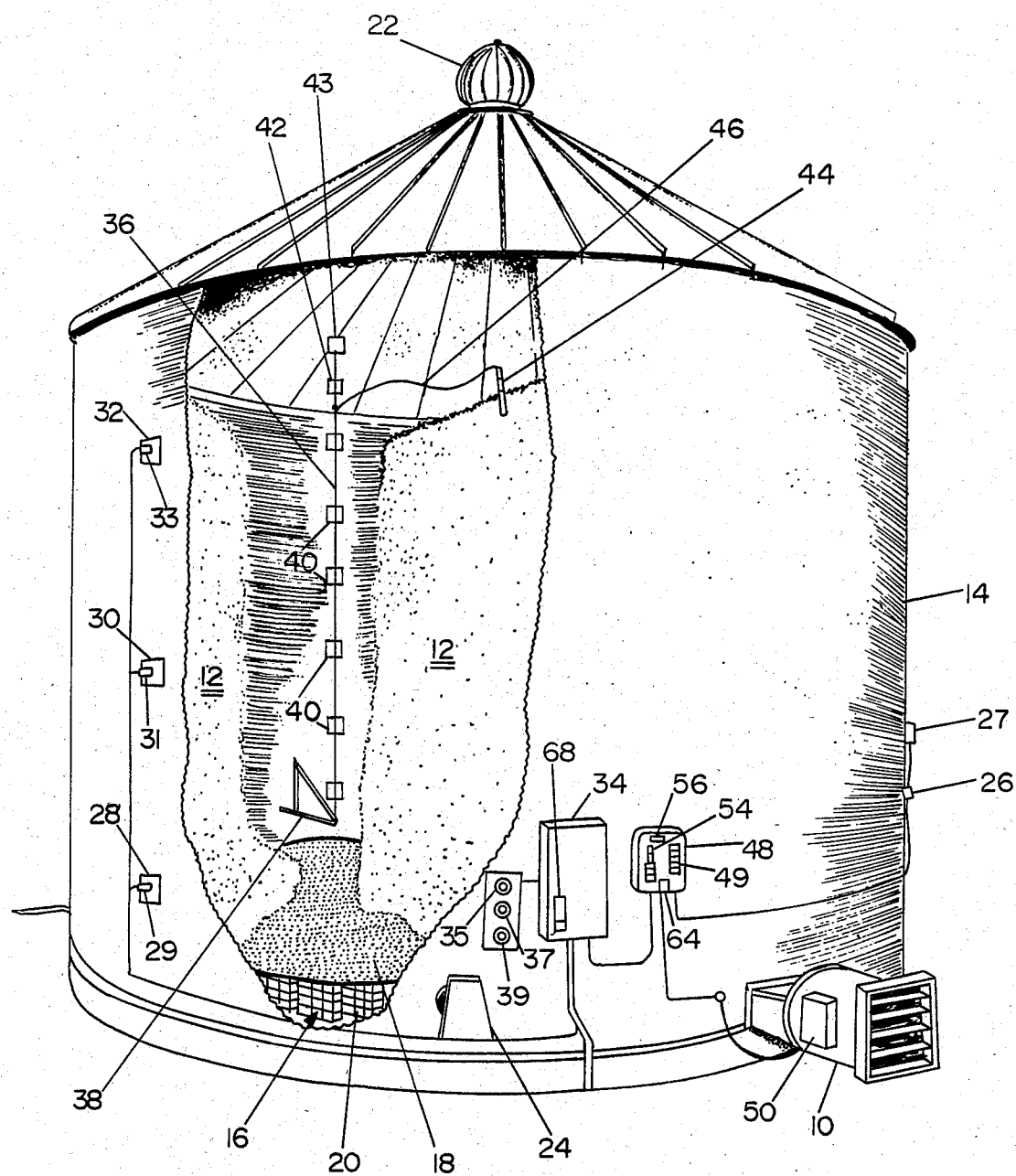
FIG. 1 is a cutaway view of a storage bin constructed according to the invention.

The physical structure of the present invention is shown in FIG. 1 in which high volume, high pressure, blower 10 forces ambient air through grain 12 stored in bin 14 (both shown cut away for better clarity). Additional blowers (not shown) may be added around the bin. Blower 10 forces air directly into plenum chamber 16, formed on the bottom of bin 14 by perforated plate 18 supported by gridwork 20 to hold it above the floor. The perforations yield a false bottom with 23 percent open area. The air forced into plenum chamber 16 thus moves out and into grain 12 through perforated plate 18 and moves upward through the grain as it equalizes the moisture content between the air and the grain. The grain will therefore be dried or moistened depending upon the moisture in the air. As the air reaches the top of bin 14, it is discharged through roof ventilator 22, which in the preferred embodiment is a wind driven ventilator. Grain auger 24 is used to remove grain from bin 14 when the grain is needed for use.

The various parameters which affect the drying conditions are monitored both inside and outside bin 14. Outside air temperature is read by temperature sensor 26 on the side of bin 14. The moisture content of the incoming air is read by humidistat 27, and the moisture content of the grain itself is read at various levels at grain ports 28, 30 and 32.

Two alternative methods of grain moisture readings are available. The manual system requires that individual samples be taken at each grain port 28, 30 and 32, that these samples be tested for moisture content by conventional manual methods and that the readings be set up on controls 35, 37 and 39 feeding comparator 34. An alternate automatic system uses sensors 29, 31 and 33 which are inserted directly into grain 12 to supply continuous readings to comparator 34. The changeover between automatic and manual is accomplished by switch 68.

A similar automatic system is used for measuring the temperature of grain 12. Cable 36 is mounted inboard from the bin side by bracket 38 and connects multiple stations 40 for monitoring the temperature of the grain surrounding the stations. Temperature sensor 42 and humidity sensor 43, at the top of cable 36, are held above the grain and furnish readings of air conditions at the top of bin 14. Temperature probe 44, attached to cable 36 by umbilical cord 46, is inserted at the very top of the grain pile and furnishes an additional temperature reading at that location. All these temperature readings are transmitted to comparator 34 by connecting cables (not shown) and, along with the other readings, furnish the information required to properly control blower 10.

Figure 2:
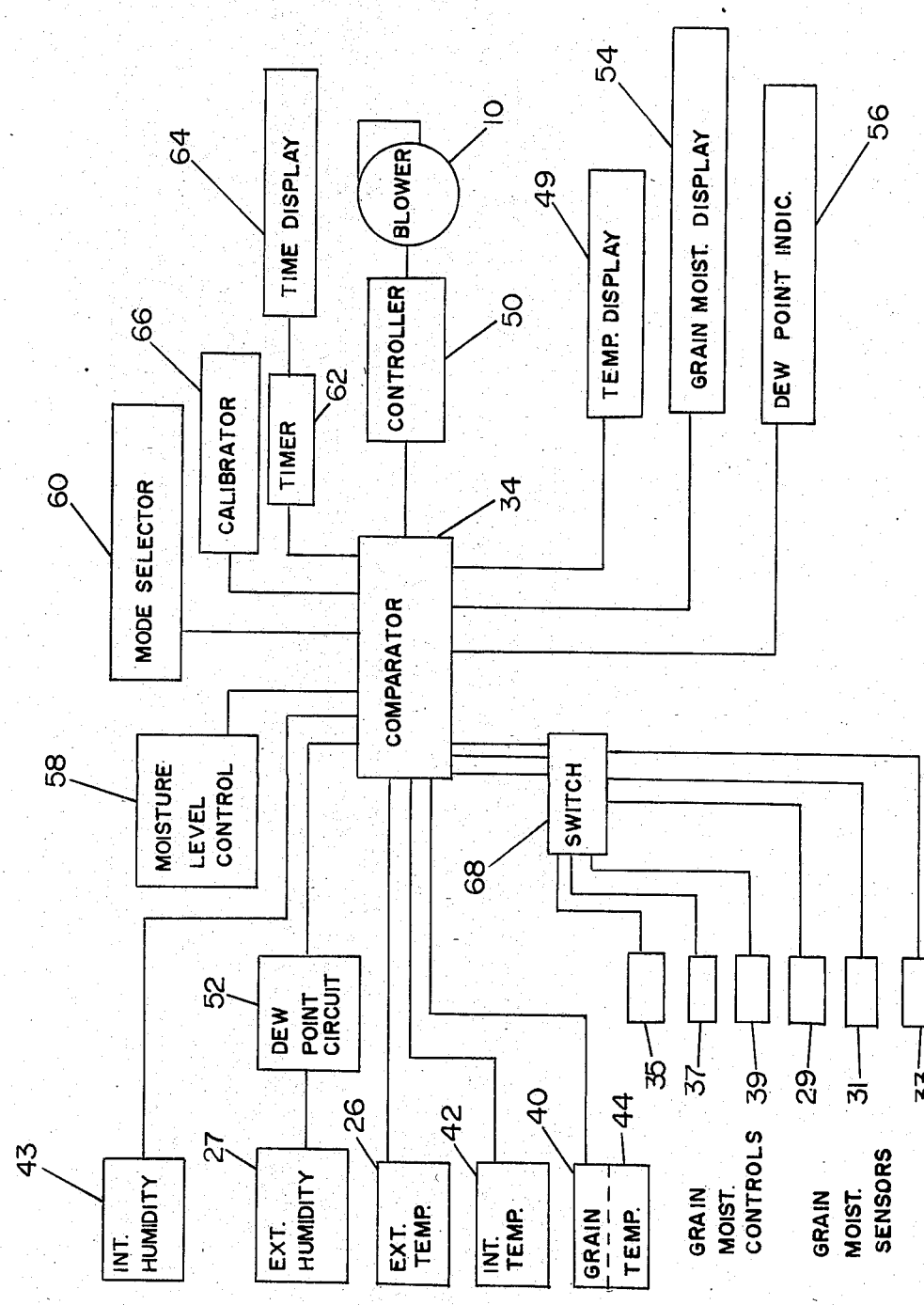
FIG. 2 is an electrical block diagram of the preferred embodiment of the invention.

FIG. 2 is an electrical block diagram of the preferred embodiment of the invention which depicts the system for controlling blower 10. Blower 10 is activated and deactivated by controller 50, but the very specific selection of conditions during which it operates is controlled by comparator 34 based on the various measured parameters.

Comparator 34 is essentially a configuration of electronic voltage level sensing circuits well known to those skilled in the electronic art. Its specific circuits can be analog or digital and can be constructed with various components such as microprocessors, semiconductors, integrated circuitry or even relays, but in each case its action is to compare a set of voltages derived from the various sensors against a preset condition, itself represented by another voltage, and to send a control signal to controller 50 when a specific condition is met. Controller 50 then activates blower 10 to circulate air through bin 14 or blocks operation of blower 10.

For instance, humidistat 27 monitors outside air humidity and generates an electronic voltage representative of the humidity. Humidistat 28 feeds dew point circuit 52 which converts the humidistat signal to a voltage function which represents the equivalent dew point, the temperature at which such air will condense its vapor. Comparator 34 compares the dew point circuit voltage output to the temperature signals available from external air temperature sensor 26, internal air temperature sensor 42, and the several grain temperature sensors 40 and 44, all of which are also connected to comparator 34, and, if any of these signals indicate a temperature below the dew point, operation of blower 10 is blocked to prevent condensation within bin 14.

All of these temperature signals and the dew point signal are also connected to display unit 48, where individual digital indicators furnish continuous displays of each parameter for verification by the operator.

The information on grain temperatures provided by signals from sensors 40 and 44 is oriented to represent the orientation of the sensors themselves, so that those several displays are located in row 49 to give the operator a more vivid indication of the location of the drying front within the actual grain bin. Similarly, the information on grain moisture levels at various heights in the bin, generated by sensors 29, 31 and 33, or alternatively entered manually at controls 35, 37 and 39 when switch 68 is set appropriately, is oriented in a row of displays 54 to represent the actual moisture levels of grain in bin 14.

Another function of comparator 34 is to continue the drying process, the operation of blower 10, only as long as the goal for grain moisture level, as set by moisture level control 58, has not yet been attained. Thus, as long as the voltage reference level set by moisture level control 58 is not matched or surpassed by the output voltages of all the grain moisture sensors 29, 31 and 33, or the equivalent manual control settings 35, 37 and 39, blower 10 is activated through controller 50. However, the blower operation has a further condition which is that humidistat 27 must furnish a voltage signal which, when compared to the grain moisture level signals, indicates that the incoming ambient air is actually drier than the grain it is coming in contact with. If this condition is not met, operation of blower 10 is also blocked. Operation of blower 10 resumes, however, anytime the air dryness condition is fulfilled, so that drying continues whenever ambient air conditions will actually permit progress toward the prescribed moisture level.

The operator of the system can select one of several modes of operation along with the goal for grain moisture level. This is accomplished at mode selector 60. One mode of operation available is the fully automatic mode described above in which blower 10 operates as long as the grain will be dried by incoming air and has not attained the desired level of dryness.

A second mode of operation is full manual operation in which the blower simply operates regardless of the moisture or temperature readings.

However, a third and unique mode is also available and is referred to as "temporary manual". In this operation, the unit operates fully manually, but after a preset time, and with no further operator action, it reverts to full automatic. Such a mode prevents accidental continuation of manual operation for so long that weather conditions may change and damage the grain. Timer 62 is used to control this mode, and, it also furnishes a real time signal to time display 64 for operator information.

The invention also includes calibrator 66, connected to comparator 34, which is used to verify the accuracy of the various voltage comparator circuits, so that maintenance requires no external voltage source for standardization.

In total, the present invention permits the efficient drying and storage of grain by utilizing the ambient air to its fullest extent while assuring that no moisture will be added to the grain when weather conditions change.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, non-turbine roof ventilators may also be used in the system, and additional blowers may be added to increase the air flow volume.

What is claimed as new and desired to be secured by Letters Patent of the United States is:

1. An automatic grain drying system comprising:
   a grain storage container;
   a blower moving air from outside the storage container through grain located within the storage container;
   a control system which monitors temperature and moisture of grain within the storage container and temperature and moisture of air outside the storage container and automatically operates the blower or blocks operation of the blower depending upon the relationship of the temperature and moisture of the stored grain to the temperature and moisture of the outside air; and
   timer means selectively actuatable manually by an operator to operate the blower manually, without influence by the temperature and moisture levels of the grain and air, for a specific period of time, and then operable automatically after said specific time period to return the system to automatic control.

2. The automatic grain drying system of claim 1 wherein the control system comprises:
   a humidistat external to the storage container and reading the moisture level of the outside air;
   a dew point circuit to convert the outside air moisture level to a function which represents its dew point;
   and a comparator circuit which compares the dew point function to temperatures within and outside the storage container and prevents blower operation if condensation is likely within the storage container.

3. The automatic grain drying system of claim 1 further including means for automatically reading grain moisture levels at several locations within the storage container; means for comparing these moisture levels to the moisture in the air moving into the storage container; and means for blocking blower operation if the moisture in the air surpasses the moisture level in the grain.

4. The automatic grain drying system of claim 1, wherein the control system includes a control which can be set to block blower operation when the grain moisture level decreases to a prescribed level.

5. The automatic grain drying system of claim 1 further including controls for manually entering data representing grain moisture levels at several locations within the grain in the storage container; means for comparing this data to the moisture in the air moving into the storage container; and means for blocking blower operation if the moisture in the air surpasses the moisture level in the grain.

6. The automatic grain drying system of claim 1 further including means for reading grain temperature at various locations within the storage container which comprises an essentially vertical configuration with multiple temperature sensors along its length.

7. The automatic grain drying system of claim 6 further including an additional temperature sensor attached to the multiple temperature sensor configuration by means of an umbilical chord so that the additional temperature sensor may read grain temperature at a location within the grain remote from the other temperature sensors.

8. The automatic grain drying system of claim 1 further including multiple temperature sensors located within the grain in the storage container and a display means which furnishes temperature readings of the multiple sensors, said display means constructed so that the temperature readings are oriented relative to each other to represent the location of the temperature sensors within the grain.

9. The automatic grain drying system of claim 1 further including a mode selection means which permits either automatic or manual operation of the blower.

10. An automatic grain drying system comprising:
    a grain storage container;
    a blower moving air from outside the storage container through grain located within the storage container;
    first means for monitoring and taking readings of grain temperatures at several locations within the storage container;
    second means for monitoring and taking a reading of air temperature outside of the storage container;
    third means for monitoring and taking readings of grain moisture levels at several locations within the storage container;
    fourth means for monitoring and taking a reading of air moisture level outside of the storage container; and
    a control system which receives said temperature and moisture level readings from said first, second, third and fourth means and operates the blower or blocks operation of the blower depending upon the relationship of the temperature and moisture levels of the grain at the several locations within the storage container to the temperature and moisture level of the air outside of the storage container.

11. The automatic grain drying system of claim 10, wherein:
    said fourth means includes a humidistat located external to the storage container for reading the moisture level of the outside air; and
    said control system includes
       a dew point circuit to convert the outside air moisture level to a function which represents its dew point, and
       a comparator circuit which compares the dew point function to temperatures within and outside the storage container and prevents blower operation if condensation is likely within the storage container.

12. The automatic grain drying system of claim 10, wherein:
    said third means includes probes for automatically reading grain moisture levels at the several locations within the storage container; and
    said control system includes
       means for comparing these moisture levels to the moisture level of the air outside of the storage container, and
       means for blocking blower operation if the moisture level of the air surpasses the moisture level of the grain.

13. The automatic grain drying system of claim 10, wherein said control system includes a control which can be set to block blower operation when the grain moisture level decreases to a prescribed level.

14. The automatic grain drying system of claim 10, wherein:

said third means includes controls for manually entering data representing grain moisture levels at the several locations within the grain in the storage container; and said control system includes
    means for comparing this data to the moisture level in the air outside of the storage container, and
    means for blocking blower operation if the moisture level in the air surpasses the moisture levels in the grain.

15. The automatic grain drying system of claim 10, wherein said first means for reading grain temperatures at various locations within the storage container comprises a generally vertical configuration with multiple temperature sensors along its length.

16. The automatic grain drying system of claim 15, wherein said first means includes an additional temperature sensor attached to the multiple temperature sensor configuration by means of an umbilical chord so that the additional temperature sensor may read grain temperature at a location within the grain remote from the other temperature sensors.

17. The automatic grain drying system of claim 10, wherein:
    said first means for reading grain temperatures at various locations within the storage container comprises multiple temperature sensors located within the grain in the storage container; and
    said control system includes a display means which furnishes temperature readings of the multiple sensors, said display means constructed so that the temperature readings are oriented relative to each other to represent the location of the temperature sensors within the grain.

18. The automatic grain drying system of claim 10, further comprising:
    a mode selection means which permits either automatic or manual operation of the blower.

19. The automatic grain drying system of claim 10, further comprising:
    timer means to operate the blower manually, without influence by the moisture levels in the grain and air, for a specific preset period of time, and then to return the system to automatic operation.

* * * * *